Figure 1:
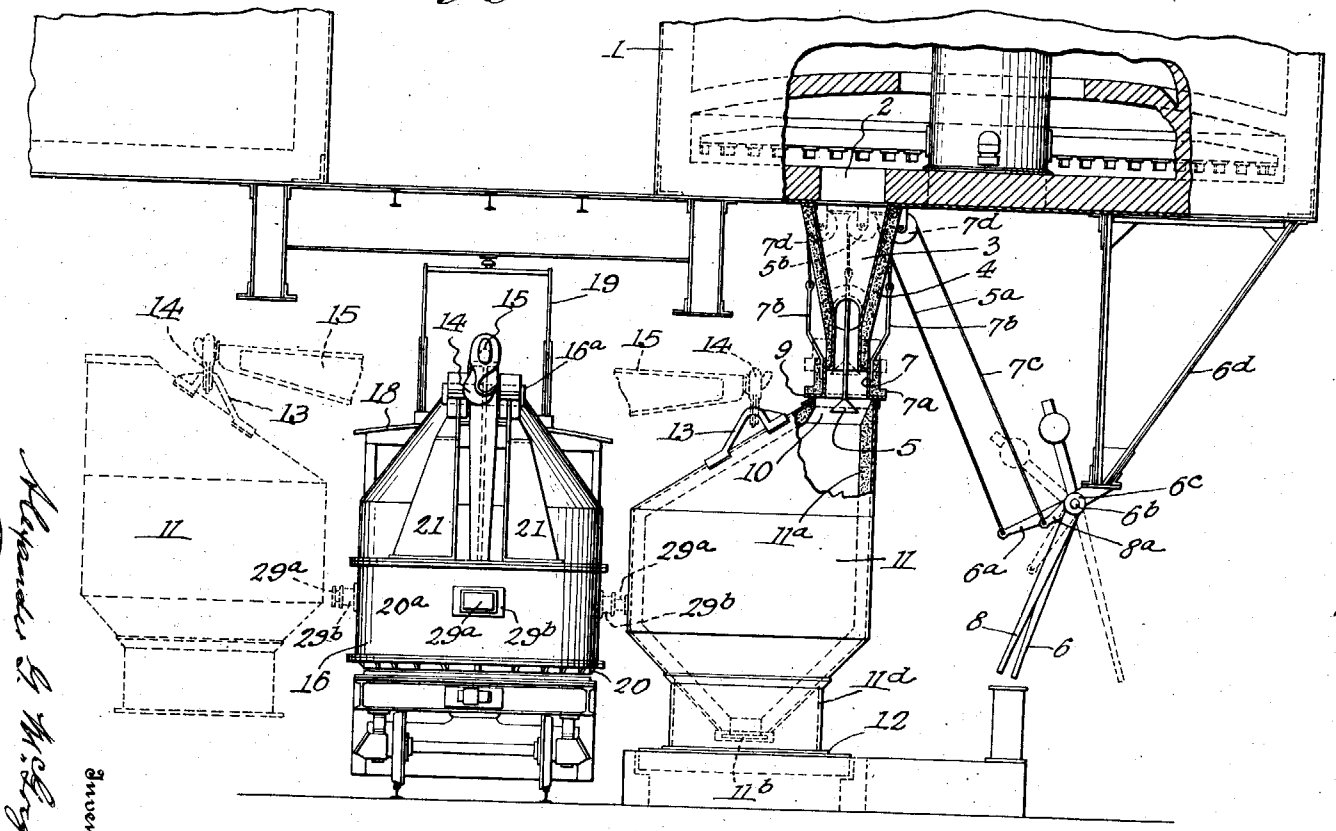

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 1

Inventor:

Alexander G. McGregor,

By Raber & Raber,

Attorneys.

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 2

Inventor:
Alexander G. McGregor,
By Calvin Rader,
Attorneys.

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 3

Inventor:

Alexander G. McGregor,

By Fabian Kalser,

Attorneys.

July 19, 1927. Re. 16,685

A. G. McGREGOR

APPARATUS FOR TRANSPORTING CALCINE FROM ROASTER FURNACES AND CHARGING SAME INTO REVERBERATORY FURNACES

Original Filed April 7, 1923 7 Sheets-Sheet 4

Inventor:

Alexander G. McGregor,

By Fulton & Fulton,

Attorneys.

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 5

Inventor:

Alexander G. McGregor,

By Raber & Raber,

Attorneys.

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 6

Inventor:

Alexander G. McGregor,

By Raber & Raber,

Attorneys.

July 19, 1927. A. G. McGREGOR Re. 16,685

APPARATUS FOR TRANSPORTING CALCINE FROM ROASTER FURNACES AND CHARGING SAME INTO REVERBERATORY FURNACES

Original Filed April 7, 1923 7 Sheets-Sheet 7

Inventor:
Alexander G. McGregor,
By Albert Calvin,
Attorney.

Reissued July 19, 1927.

Re. 16,685

UNITED STATES PATENT OFFICE.

ALEXANDER GRANT McGREGOR, OF WARREN, ARIZONA.

APPARATUS FOR TRANSPORTING CALCINE FROM ROASTER FURNACES AND CHARGING SAME INTO REVERBERATORY FURNACES.

Original No. 1,549,141, dated August 11, 1925, Serial No. 630,589, filed April 7, 1923. Application for reissue filed July 1, 1926. Serial No. 121,730.

In extracting copper from its sulphide ores in copper smelting works it is common practice to roast the crushed ores or concentrates in roaster furnaces having circular hearths superimposed one above another. These roaster furnaces discharge their product, commonly known as calcine, into hoppers underneath, each of these hoppers usually having a capacity for holding several hours product of a furnace. The calcine hoppers are attached to the steel work supporting the roaster furnace, and the furnace and hopper or hoppers are placed high enough above the ground so that cars running on tracks on the ground below may be spotted under the gate or chute in the bottom of a hopper for receiving the calcine. The calcine is then transferred in these so-called calcine cars from the roaster furnace department to the reverberatory furnace department of the smelting works. In the transfer the cars and contents are usually weighed on a railroad scale.

A reverberatory furnace usually has a row of hoppers directly over each of its two long side walls. Railroad tracks are usually provided over these hoppers so that the contents of the calcine cars may be discharged into these reverberatory furnace hoppers and from these overhead hoppers the calcine passes down through pipes or tubes and through holes provided in the roof of the furnace. The pipes or tubes direct the charge in the holes in the furnace roof. From this point the charge has a free fall through the atmosphere of the furnace to the pile of charge in the furnace below. The calcine charge, in thus passing down through these tubes to the furnace roof, and through the holes in the roof, and also through the chamber of the furnace, gains considerable momentum which prevents a part of it from lodging on the pile of charge below, but, instead, causes it to continue its downward course and spread out over the pile of smelting charge below, and, to some extent, out over the molten slag in the center of the furnace. The new charge thus becomes more or less incorporated with the slag thereby causing more or less loss of the calcine. Also when the dusty charge passes through the holes in the roof of the furnace, it comes in contact with the heated walls surrounding said holes with the result that the charge particles flux away the heated refractory walls of the holes and the holes grow rapidly in size requiring frequent repairs and renewals. By depositing the charge through an extensible tube the lower end of which is adjacent or contiguous to the pile of material in the furnace, as hereinafter set forth, the loss of valuable material in the slag is much lessened, as the charge is prevented from running out over the slag-covered molten bath; also the usual excessive wear and fluxing away of the furnace arch around the charge holes is prevented.

As the calcine is usually very dusty a certain amount is lost in the transfer from the roaster hopper to the calcine car, and from the calcine car into the reverberatory furnace hoppers.

Also the free fall through the atmosphere inside the furnace liberates a great deal of dust so that, at the time of charging, the furnace is filled with dust. The dust thus raised has a number of bad effects or disadvantages, as follows:

(*a*) The furnace roof is of silica brick and is maintained at a nearly fusing temperature inside the furnace. The dust from the charge, being basic, it fluxes the nearly fusing silica and thus greatly increases the erosion of the furnace roof which requires frequent renewals.

(*b*) The fine dust settled upon the blanket of slag in the furnace and often the proper fluxing element is not present for such dust particles, and they pass out of the furnace without giving up their precious metal value to the matte underneath the blanket of slag, and thus the dust raised inside the furnace increases the slag losses.

(*c*) A great deal of dust is carried along through the furnace by the strong draft of the furnace, settling down in the flue connection, and in the waste heat boilers beyond, and on the heating surface of said boilers. Extra labor is required to keep the flues and boilers cleaned out. Also there is excessive wear on the boiler tubes, especially the first row of tubes, due to the sand blast effect of the dust particles impinging upon them.

(*d*) Some of the dust raised in the furnace during the charging operation passes entirely beyond the flues and waste heat boilers and up through the stack and to the outside atmosphere, entailing further loss of valuable material.

By the system of calcine handling and furnace charging now practiced, the calcine leaving the last roaster hearth often has a temperature of over 1200° F., and often cools down to less than 700° F. before it is finally deposited inside the reverberatory furnace. As about three heat units in fuel are required to impart one heat unit to the charge in the furnace, it is apparent that if the temperature of the calcine leaving the roaster hearth be carefully conserved a considerable saving in reverberatory furnace fuel will result.

The present invention relates to an apparatus or system whereby calcine may be transferred from a roaster furnace to the inside of a reverberatory furnace in such a manner as to avoid the many disadvantages hereinbefore indicated incidental to the present practice.

Figure 2:
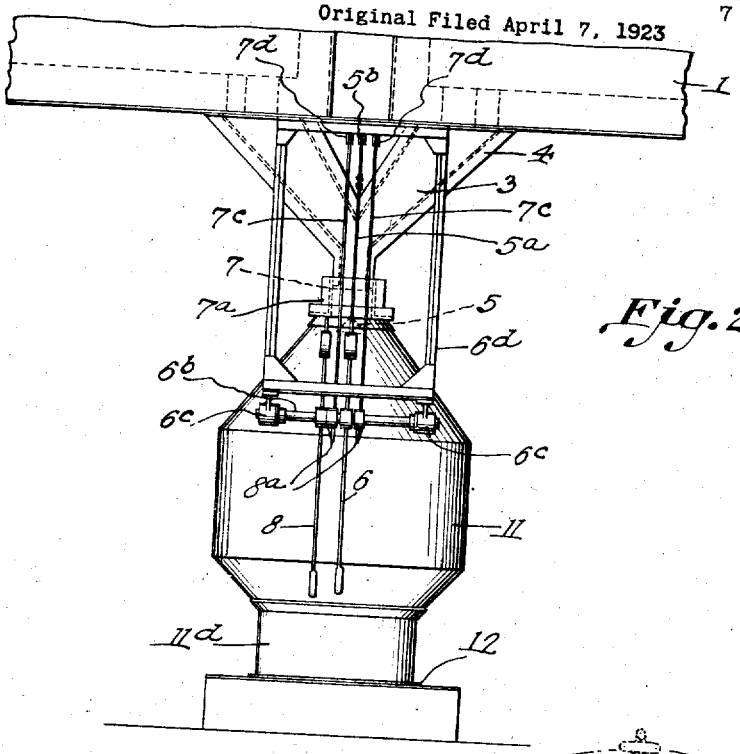
Figure 3:
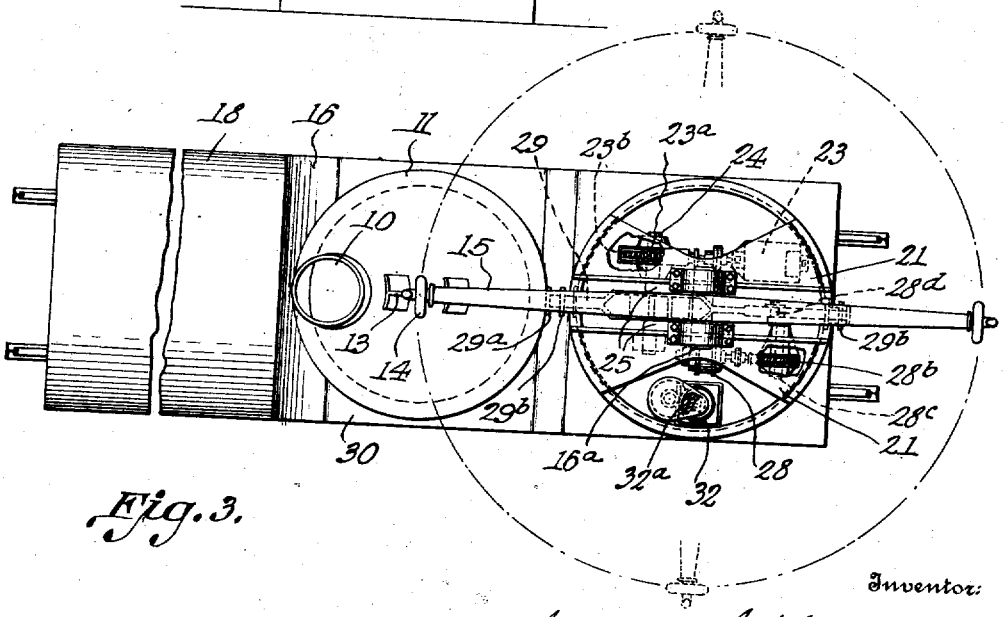
Figure 4:
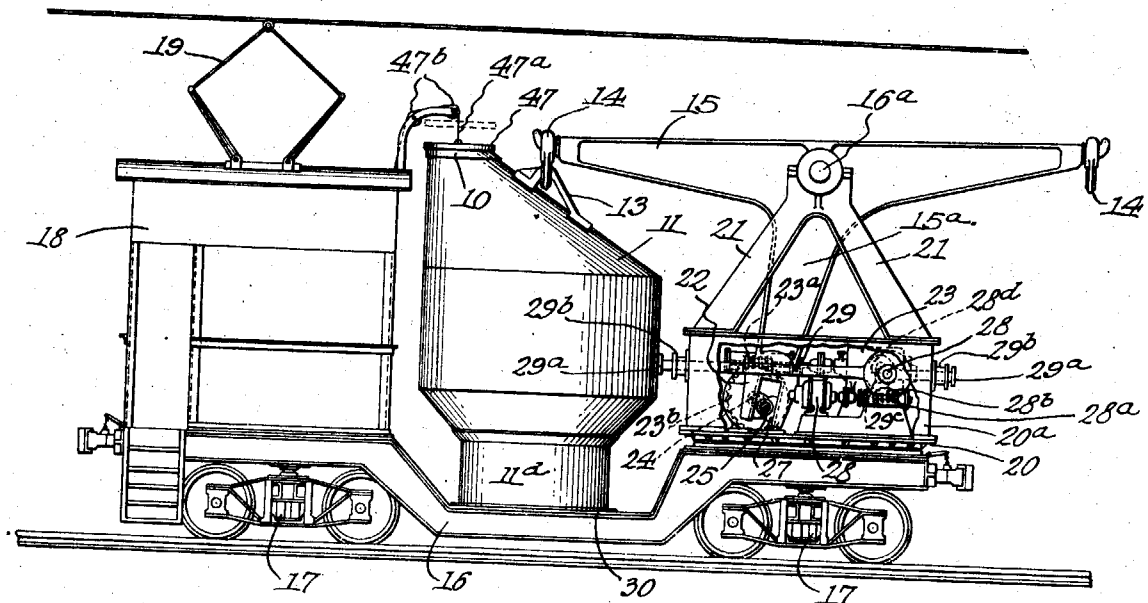
Figure 5:
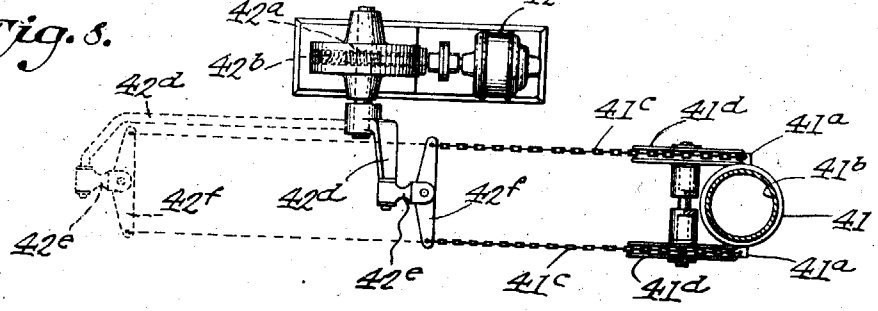
Figure 5:
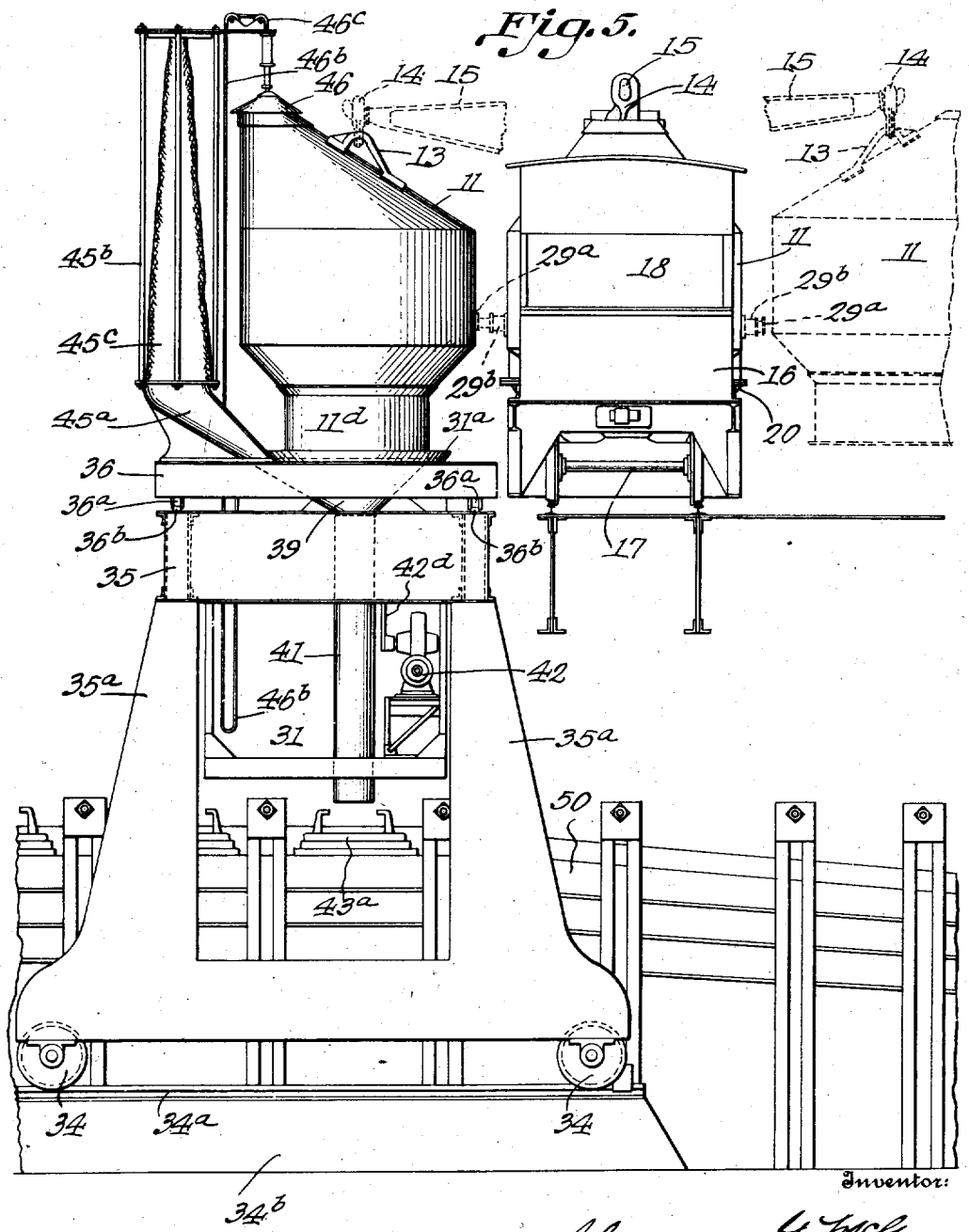
Figure 6:
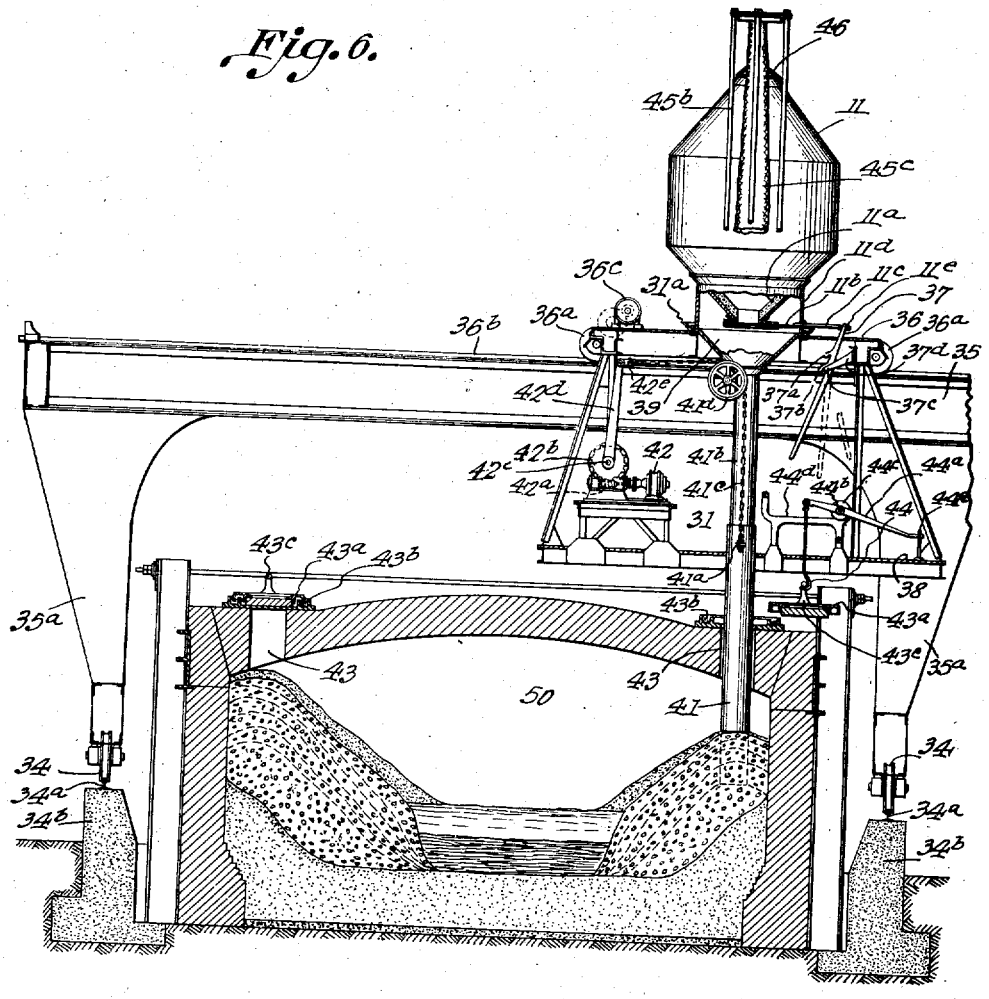
Figure 7:
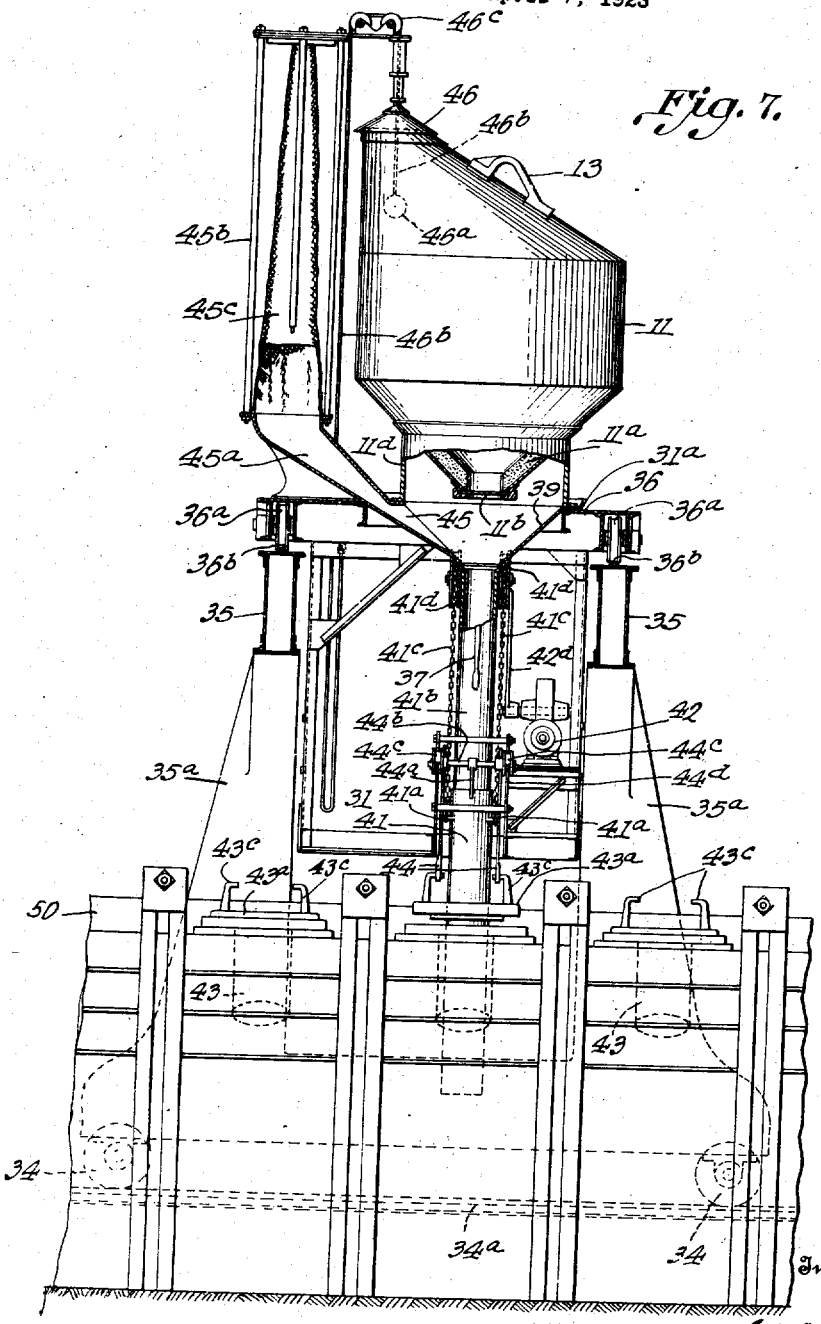
Figure 9:
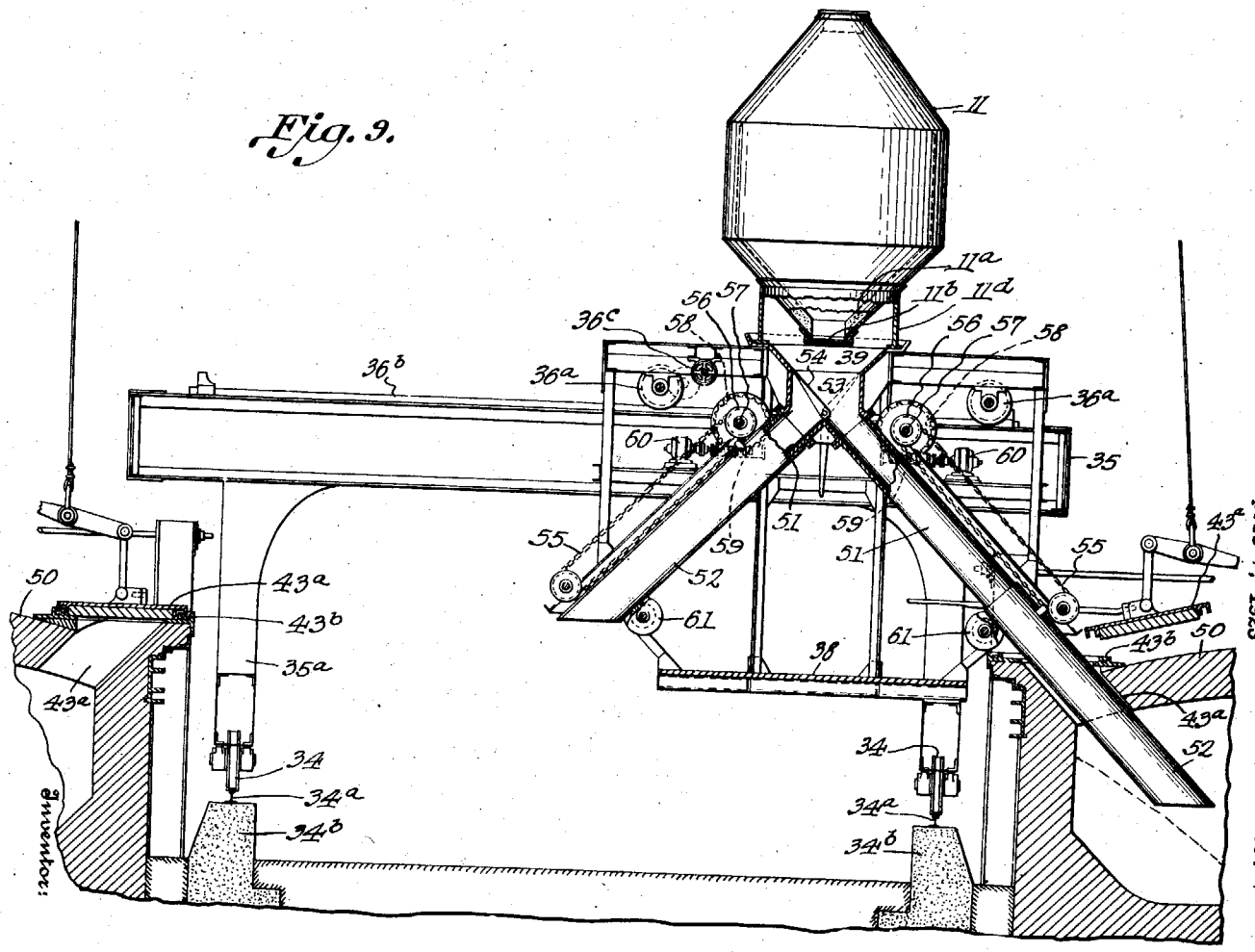

In the accompanying drawings Fig. 1 is an elevation, partly in section, showing a transfer container located beneath a roasting furnace and adjacent a transfer car. Fig. 2 is an elevation of the same looking from the right of Fig. 1, with the transfer car omitted. Fig. 3 is a plan view of the transfer car with the container mounted thereon. Fig. 4 is an elevation of the same. Fig. 5 is an elevation showing a transfer car and a charging machine with a container mounted thereon adjacent a reverberatory furnace. Fig. 6 is an elevation of a charging machine with a container mounted thereon over a reverberatory furnace. Fig. 7 is an elevation of the same looking from the right of Fig. 6. Fig. 8 is a detail plan view showing means for raising and lowering the sleeve of the telescoping charging tube. Fig. 9 is a sectional elevation illustrating a modified form of charging machine.

Referring to the drawings, 1 denotes a roasting furnace or furnaces from which the hot roasted ores, in more or less comminuted form, are discharged, as through an opening 2, into a chute 3, having an insulated covering 4. The outlet from the chute 3 is controlled by a vertically movable valve or gate 5 joined, by a cable $5^a$ or other suitable flexible connection passing over a pulley $5^b$, with an arm $6^a$ controlled by an operating handle 6, said arm and handle being preferably connected with a rock-shaft $6^b$, mounted in bearings $6^c$ sustained by a suitable frame $6^d$ suspended beneath the roasting furnace 1.

Mounted at the lower end of the chute 3 is a sliding sleeve 7 also preferably having an insulated covering $7^a$ said sleeve being provided with upwardly extending arms $7^b$ to which are attached cables or other suitable connections $7^c$ passing over pulleys $7^d$ and running from said pulleys to an arm $8^a$ on the rock-shaft $6^b$ and to which rock-shaft is also attached an operating handle lever 8 by which and the connections referred to the said sleeve may be raised and lowered. The sliding sleeve 7 is provided with a flange 9 fitting closely over the entrance mouth 10 of a container 11 when said container is located beneath said sleeve, as shown more clearly in Fig. 1. The container 11 is preferably provided with an insulating lining $11^a$, although the said container may, if desired, have an insulating covering, as is shown on the chute 3 and sleeve 7, for the purpose of retaining the heat in the material discharge from the roasting furnace 1.

The container 11 is shown in Fig. 1 as resting on a scale platform 12, said container being provided with an eye 13 adapted to be engaged by a lifting hook 14 carried by an arm 15 of a three-armed walking-beam mounted on a transfer car 16. The said car is provided with suitable trucks 17 which, in practice, will be equipped with electric motors similar to the usual electric car trucks, for driving the car. Also the said car comprises an operator's cab 18 which, in practice, will be equipped with suitable electric controllers to enable the operator to manipulate the car and the parts mounted thereon by electric connections of well-known form, such connections receiving current from an overhead trolley wire through a collector 19.

Mounted on the transfer car 16 is a turn-table 20 supporting a turret $20^a$ on which are mounted suitable supports 21 for the gudgeons $16^a$ of the three-armed walking-beam which is to handle the containers 11. The depending arm $15^a$ of the said walking-beam is provided with a fork 22. Mounted on the turn-table 20 is an electric motor 23 the shaft of which carries a worm gear $23^a$ meshing with a worm wheel $23^b$ mounted on a shaft 24 provided with a crank 25 and which crank is preferably provided with a sliding shoe 27 working in the fork 22. By means of this mechanism rocking movements may be imparted, when desired, to the three-armed walking-beam, as will be understood, for the purpose of lifting or lowering the containers.

Also mounted on the turn-table 20 is an electric motor 28 the shaft of which carries a worm $28^a$ meshing with a worm gear $28^b$ on a shaft $28^c$ having a crank $28^d$. Mounted to slide in bearings $29^b$ supported on the turret $20^a$ is a thrust bar 29 an enlarged rear part of which is provided with a slot $29^c$ in which the crank $28^d$ works; the outer end $29^a$ of said thrust bar impinging against a container 11. The lifting eye 13 of the said container is so located that the container will hang slightly out of plumb, the lower end tending to swing in toward the turret $20^a$, and the thrust bar 29 is provided to overcome this tendency when the container is being lowered onto a platform scale 12, or onto the platform 30 of a transfer car, or onto a platform of a charging machine 31.

Also mounted on the turn-table 20 is an electric motor 32 the shaft of which is connected by suitable gearing 32[a] with the said turn-table, so that the latter, with the walking beam and other parts mounted on said turn-table, may be rotated when desired. The motors 23, 28 and 32 will have suitable electric connections, which it is not necessary to illustrate in detail, extending to the cab 18, and by means of which the driver of the car in said cab may cause these motors to be operated at proper times to perform their intended functions, as hereinbefore indicated.

The charging machine 31 is mounted on a bridge or travelling crane 35 the side legs or supports 35[a] of which are provided with wheels 34 running on tracks 34[a] on suitable ways 34[b] extending lengthwise of the reverberatory furnace or furnaces 50, so that the said charging machine may be caused to travel back and forth over the furnace or furnaces. The charging machine is carried by a truck or trolley 36 provided with wheels 36[a] running on tracks 36[b] on the travelling bridge or crane 35, so that said charging machine may be caused to travel from one side to the other of the said travelling bridge or crane in charging the opposite sides of a furnace. To effect the travelling movements of the truck or trolley 36 on the tracks 36[b] an electric motor 36[c] suitably geared to the driving wheels of the said truck is preferably provided. In practice a travelling bridge or crane and a charging machine thereon will preferably be provided for each furnace.

The truck or trolley 36 is provided with a support 31[a] adapted to receive a container 11, and said container is provided at its bottom with a sliding gate 11[b] having an extension 11[c] working through the side walls 11[d] on said container, the said extension having an opening or eye 11[e] at its outer end adapted to receive the upper end of the operating lever 37. The lever 37 is provided with hooks 37[a] and 37[b] to engage a fulcrum support 37[c] afforded by a bracket 37[d] mounted on the truck or trolley 36. When the said lever is suspended from the hook 37[b], as shown in Fig. 6, its upper end will be engaged in the eye portion 11[e] of the operating extension 11[c] of the sliding gate 11[b] and will thus be in a position to move the said sliding gate in and out as may be desired; but when the said lever is not in use the hook 37[b] will be disengaged from the fulcrum support 37[c] and the hook 37[a] then be engaged with said support, thus lowering said lever out of the way and disengaging it from the operating connection 11[c]. The lever 37 may be manipulated by an operator standing on the platform 38.

Mounted on the truck or trolley 36 is a hopper 39 beneath the gate 11[b] of the container 11, said hopper serving to guide the material discharged from said container to a charging tube consisting of a movable sleeve 41, and a fixed portion or tube part 41[b] extending from the bottom of said hopper 39. The sleeve 41 is provided with ears 41[a] to which are attached chains 41[c] running over pulleys 41[d]. Suitably supported on the charging machine is an electric motor 42 the shaft of which is provided with a worm 42[a] geared to a worm wheel 42[b] on a shaft 42[c] carrying an upwardly extending arm 42[d] with which is connected a link or clevis 42[e] carrying an evener 42[f] to which the ends of the chains 41[c] are attached. By virtue of this construction the sleeve portion 41 of the telescoping charging tube may be raised and lowered through holes 43 in the top of the reverberatory furnace, as will be understood.

The furnace is provided at intervals near its side walls, or at any other desired points, with the charging holes 43, and these charging holes are furnished with easily removable covers 43[a] fitting into sand lutes or seals 43[b], said covers being provided with lifting lugs 43[c]. The covers 43[a] may be removed from over the charging holes by means of hooks 44 the shanks of which are jointed at their upper ends to levers 44[a], the fulcrums 44[b] of said levers being concentric with rollers 44[c] adapted to be moved back and forth on tracks 44[d]. When a cover is removed laterally as shown at the right in Fig. 6 the outer end of the lever carrying said hooks may be engaged with a hooked retaining standard 44[e] on the platform 38.

The extensible part 41 of the telescopic tube is adapted to fit rather closely in the charging openings or holes 43, in the roof or arch of the furnace, as will be understood from Figs. 6 and 7 of the drawings. This is important, as, at the time of charging, and when the tube is extended down below the charging holes, the said tube serves as a lining and protector for the said openings, thus preventing the dusty calcine from coming in contact with the hot walls of said openings, and thereby avoiding the fluxing away of the furnace arch around said openings.

By beveling off the ends of the extensible parts of the telescopic tubes, as shown in Fig. 9, they are adapted to fit more closely over the piles of calcine charged into the furnace so as better to prevent escape of dust into the furnace chamber.

The hopper 39 communicating with the charging tube 41[b] is provided at one side with an opening communicating with the chamber 45 of a spout 45[a] attached to the lower end of a frame 45[b] which supports a fabric bag 45[c] the open lower end or mouth of which communicates with the chamber of the said spout 45[a]. The spout 45[a] serves as an air and dust vent from the charging tube, and the fabric bag 45[c] is of closely woven material which will permit the passage of air but will retain dust particles which may fall back into the spout 45[a] and be returned to the hopper 39.

Supported from the top of the frame 45[b] is a cover 46 fitting closely over the mouth 10 of the container 11, said cover being adapted to be raised and lowered by means of a float 46[a] and a chain 46[b] passing over pulleys 46[c] supported by the said frame 45[b]. The float 46[a] may be used as a sounding device by the operator for ascertaining the approximate amount of charge in the container at any time. Supported from the top of the cab 18 of the transfer car is a cover 47 which may be fitted over the open mouth 10 of a container 11 when the container is being transferred from the roasting furnace to the reverberatory furnace, said cover being attached to a chain 47[a] running over pulleys 47[b] and downward to a point convenient for access by the operator.

It will be understood that by reason of the fact that as each container 11 is provided with a heat insulating lining, and that the chute 3 and sleeve 7 are also provided with heat insulating coverings, the heat in the hot material discharged from the roasting furnace will be retained so that the roasted material may be delivered to the reverberatory furnace while still hot, thereby greatly economizing heat in the smelting operation, as hereinbefore indicated. Also the radiation of heat from the inside of the containers in being transferred from the roasting furnace to the reverberatory or smelting furnace will be prevented by the cover 47 on the transfer car and the cover 46 on the charging machine.

Fig. 9 illustrates a modified form of charging machine most of the parts of which are similar to those of the charging machine hereinbefore described, and are similarly indicated by reference characters, but in this modified form of charging machine two inclined charging tubes having fixed portions 51 and sliding sleeve portions 52 are provided, these inclined charging tubes communicating through a tubular portion 53 with the hopper 39 which receives the material from the container 11. A gate 54 is mounted in the sleeve portion 53 so that the material from the said hopper may be directed into either one of these inclined charging tubes which are arranged to extend through inclined openings 43[a] in the reverberatory smelting furnaces 50. Connected with the sliding sleeves 52 are chains 55 running over pulleys 56 mounted on shafts 57 carrying worm wheels 58 meshing with worms 59 on the shafts of electric motors 60. These connections between the sliding sleeves 52 and the electric motors 60 enable the said sleeves to be moved up and down, as will be understood. The sliding sleeve portions 52 of the charging tubes rest on steadying wheels 61.

The operation of my system may be described as follows: The transfer car having an empty container supported by one arm of the walking-beam 15 is stopped opposite a filled container at the roaster plant. At this time the gate or valve 5 is closed and sleeve 7 is raised. With the empty container attached to one arm, the walking-beam is swung around and its other arm is engaged with a loaded container located beneath the chute 3. The loaded container is then raised slightly from the scale upon which it was resting and is swung around and set upon the platform 30 of the transfer car, the empty container at such time acting partly as a counterbalance for the loaded container. The hook 14 is then disengaged from the loaded container and the beam is swung around and the empty container is set upon the scale platform 12 just vacated by the loaded container. The sleeve 7 is now lowered to close the space between chute 3 and the mouth 10 of the container and the valve 5 is opened by being lowered. After the arm 15 of the walking-beam is disengaged from the empty container it is swung in a position nearly parallel with the axis of the car so as to reduce the clearance required for the car, but neither arm 15 of the walking-beam need engage the lifting eye of the loaded container.

The transfer car carrying the loaded container now proceeds to the reverberatory furnace plant and stops opposite a charging machine having an empty container resting upon it. The walking-beam is then swung around and one arm 15 engages the lifting eye of the empty container. The empty container is lifted and the beam is swung around and the other arm is engaged with the lifting eye of the loaded container. With the empty container assisting in counter-balancing the loaded container, the latter is lifted off the car and swung around to take the place on the charging machine just vacated by the empty container. After the beam is disengaged from the loaded container, the empty container is swung around over the platform 30 of the car. The empty container may or may not be lowered to rest upon the platform, and the hook is not disengaged from it. The transfer car with the empty container is now ready to proceed back to the roaster plant, thus completing its cycle of operation.

The charging machine carrying a loaded container and with handle 37 engaged with gate 11[b] is stopped with the sleeve 41 directly above a charge hole through which a charge is to be delivered. The charge hole cover 43ᵃ is moved to one side by means of handle 44ᵃ and hooks 44. The sleeve portion 41 of the charging tube is then lowered down so that its lower end rests upon, or nearly rests upon, the melting charge inside the furnace. The gate 11ᵇ is now opened by means of handle 37 and the hot calcine from container 11 is allowed to run down through the charging tube 41ᵇ and sleeve 41 and be deposited upon the melting charge already in the furnace. The sleeve 41 is then gradually raised slowly enough at all times so that its lower end is kept filled up for some distance with the charge. The dusty charge will thus slide gently down the slopes of that which was first deposited, but in no event is the sleeve 41 to be raised fast enough so that the material issuing from its lower end will have a free fall through the furnace atmosphere and thus liberate a cloud of dust.

The bottom end of the sleeve 41 may thus be raised gradually up to the furnace arch leaving a somewhat conical shaped pile of charge beneath. If desired the sleeve may be pressed down again, crowding the charge just deposited sideways and out further into the furnace. The slow raising operation may be repeated and additional charge deposited. The downward thrusting and spreading of the charge and the slow raising may be repeated several times if desired. When sufficient charge has been deposited the gate 11ᵇ is closed, the sleeve 41 is then entirely removed from the charge hole 43 of the furnace, and the cover 43ᵃ replaced. The bridge or travelling crane 35 may then be moved along the furnace and stopped in proper position for lowering the sleeve 41 in the next hole 43 to be charged, and so on.

When the container 11 is empty gate 11ᵇ is closed and the lever 37 is shifted so that it will be supported by hook 37ᵃ on fulcrum 37ᶜ. In this way the upper end of lever 37 will be down in the clear so that the container 11 may be swung around without interfering with said lever 37. When the loaded container is again placed on the support 31 the upper end of lever 37 is moved up so as to enter the hole 11ᵉ and thus engage the gate stem 11ᶜ, and in this raised position the lever 37 will be supported by hook 37ᵇ. In this position lever 37 can be used to open or close the gate 11ᵇ at will.

It is to be understood that the foregoing description of the invention and the accompanying drawings are for illustrative purposes only, and that the mechanical details of the apparatus shown and described may be varied widely without departing from the spirit of the invention. For example, the container 11 may be placed upon another car at the right hand end of Fig. 4 instead of on the car carrying the revolving turret and lifting means, and rigid jibs or booms may be substituted for the walking beam, each jib or boom having its own lifting or hoisting mechanism. Also the charging tube and sleeve projecting down inside of the furnace at the time of charging, for the purpose of preventing dust inside the furnace, might be employed in connection with a stationary hopper without departing from the spirit of my invention. Also the tube and telescopic sleeve might be used in connection with a movable charge car running on a track over the furnace.

Having thus described my invention I claim and desire to secure by Letters Patent:

1. An apparatus for transferring hot ore product from a roasting furnace to a smelting furnace, comprising a container having a heat non-conducting or insulated outer wall, a filling opening at its top, a discharge opening at its bottom, and a gate for controlling said discharge opening, combined with means for transferring said container from beneath a roasting furnace when filled to a position over a smelting furnace into which its contents are to be discharged, said means comprising a transfer car provided with lifting and transporting means adapted to raise said container when filled and place it on said car and subsequently move said container from the car and place it over the smelting furnace.

2. An apparatus for transferring hot ore product from a roasting furnace to a smelting furnace, comprising a container having a filling opening at its top, a discharge opening at its bottom, and a gate for controlling said discharge opening, combined with means for transferring said container from beneath a roasting furnace when filled to a position over a smelting furnace into which its contents are to be discharged, said means comprising a transfer car provided with lifting and transporting means adapted to raise said container when filled and place it on said car and subsequently move said container from the car and place it over the smelting furnace.

3. An apparatus for transferring hot ore product from a roasting furnace to a smelting furnace, comprising a container having a filling opening at its top, a discharge opening at its bottom, and a gate for controlling said discharge opening, combined with means for transferring said container from beneath a roasting furnace when filled to a position over a smelting furnace into which its contents are to be discharged, said means comprising a transfer car having a turn-table, a three-armed walking-beam mounted on said turn-table, and means for operating said turn-table and said walking-beam.

4. An apparatus for transferring hot ore product from a roasting furnace to a smelting furnace, comprising a container having a filling opening at its top, a discharge opening at its bottom, and a gate for controlling said discharge opening, combined with means for transferring said container from beneath a roasting furnace when filled to a position over a smelting furnace into which its contents are to be discharged, said means comprising a transfer car provided with lifting and transporting means adapted to raise said container when filled and place it on said car, a charging machine to which said container may be transferred from said car by said lifting and transporting means, said charging machine having an extensible charging tube, and means for moving said charging machine over the smelting furnace.

5. An apparatus for transferring hot ore product from a roasting furnace to a smelting furnace, comprising a container having a filling opening at its top, a discharge opening at its bottom, and a gate for controlling said discharge opening, combined with means for transferring said container from beneath a roasting furnace when filled to a position over a smelting furnace into which its contents are to be discharged, said means comprising a transfer car having a turn-table, a three-armed walking-beam mounted on said turn-table, and means for operating said turn-table and said walking-beam, a charging machine to which said container may be transferred from said car by said lifting and transporting means, said charging machine having an extensible charging tube, and means for moving said charging machine over the smelting furnace.

6. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace.

7. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car and suitable means for moving said containers to and from said transfer car.

8. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having means for raising and lowering said containers.

9. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having means for raising and lowering said containers, and means for moving said containers horizontally.

10. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having suitable means for moving said containers to and from said car, said car having a platform upon which to rest said containers while they are being transferred from a roasting furnace to a smelting furnace.

11. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having propelling means, a revolving turret, and hoisting means on said revolving turret for lifting and lowering said containers.

12. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having propelling means, a revolving turret, hoisting means on said revolving turret for lifting and lowering said containers, and means for supporting said containers while they are moved from one furnace of the plant to another.

13. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said transfer means consisting of a transfer car having a revolving turret provided with hoisting means extending on two opposite sides, whereby an empty container on one side may be used to partly counterbalance a loaded container on the other side.

14. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having a revolving turret provided with hoisting means on two opposite sides, whereby an empty container on one side may be used to partly counterbalance a loaded container on the other side, and a support for a loaded container while the hoisting means on one side is swinging around to engage an empty container that will serve as a counterbalance while swinging the loaded container off the transfer car to its support at the desired location.

15. In a plant for handling comminuted ores where the product of a roasting furnace is to be transferred to a smelter, a system of portable closed containers and transfer means for said containers whereby the full containers from a roasting furnace are replaced by empty containers from a smelter, and empty containers from a smelter are replaced by full containers from a roasting furnace, said means consisting of a transfer car having propelling means, a revolving support, and a walking-beam mounted on said support, said walking-beam having means at its outer ends for engaging said containers, and means for causing the walking beam to oscillate up and down in raising or lowering the containers.

16. An apparatus for transferring hot ore product from a roasting furnace to a smelting furnace, comprising a container having a heat non-conducting or insulated outer wall, a filling opening at one side of its top, a lifting engagement device near the central part of said top and a discharge opening at its bottom, combined with a gate for controlling said discharge opening and with means for transferring said container from beneath a roasting furnace, when filled, to a position over a smelting furnace into which its contents are to be discharged, said means comprising a transfer car provided with lifting and transporting means adapted to engage said lifting device so as to raise said container when filled and place it on said car and subsequently move said container from the car and place it over the smelting furnace, the one-sided location of said filling opening permitting the container to be engaged by the lifting means without interference.

17. A transfer car having propelling means, a revolving support, a walking-beam mounted on said support, means, mounted upon the body of said car, for rotating said support, said walking beam having means at its outer ends for engaging loads, and means for causing the walking-beam to oscillate up and down in performing its function of raising and lowering the containers.

18. An apparatus for charging a reverberatory furnace with dusty material, comprising a tube with means for projecting it down into the said furnace at the time of charging so that its lower end may rest or nearly rest upon the surface of material already smelting in the furnace, the new dusty charge thus passing down into said furnace through said tube, means for gradually raising said tube allowing the charge to progressively build up and slope somewhat conically from the lower end of said tube, and means whereby said tube may be again forced down into said furnace, flattening out the charge material already in the furnace in such a way that the upper part of said pile of charge will be forced downwardly over the sloping part of said charge without any of said charge having a free fall through the atmosphere inside of said furnace, thus making room for more charge without the liberation of dust inside of said furnace.

19. A system for transferring calcine from a roaster furnace to a reverberatory furnace, consisting of portable closed containers adapted to be located under a roaster furnace, for receiving the product of said roaster furnace, means for transferring said containers to the reverberatory furnace, means for discharging the contents of said containers directly from said containers into said reverberatory furnace, and means for avoiding a free fall of said charge through the atmosphere inside of said last-named furnace.

20. A system for transferring calcine from a roaster furnace to a reverberatory furnace for the purpose of reducing temperature and dust losses, consisting of portable, heat-insulated, closed containers adapted to be placed under a roaster furnace, for receiving the product of said roaster furnace, means for transferring full containers from the roaster furnace to a reverberatory furnace, means for discharging the contents of said containers directly into said reverberatory furnace, and means for avoiding a free fall of the charge through the atmosphere of said last-named furnace.

21. A system for transferring calcine from a roaster furnace to a reverberatory furnace, consisting of portable closed containers adapted to be placed under the roaster furnace, for receiving the hot product of said roaster furnace, means for transferring said containers to the reverberatory furnace, means for discharging the contents of said containers directly from said containers into said reverberatory furnace, and means for avoiding a free fall of the charge through the atmosphere of said last-named furnace.

22. In a plant for handling comminuted ores where the product of a roasting furnace is to be transferred to a smelter, a system of portable closed containers, and transfer means for said containers whereby the full containers from a roasting furnace are replaced by empty containers from a smelter, and empty containers from a smelter are replaced by full containers from a roasting furnace, said means consisting of a transfer car having means for raising and lowering said containers, and means for steadying the containers laterally when lifted.

23. In a plant for handling comminuted ores where the product of a roasting furnace is to be transferred to a smelter, a system of portable closed containers, and transfer means for said containers whereby the full containers from a roasting furnace are replaced by empty containers from a smelter, and empty containers from a smelter are replaced by full containers from a roasting furnace, said means consisting of a transfer car having means for raising and lowering said containers, means for moving said containers horizontally, and means for steadying the containers laterally when lifted.

24. In a plant for handling comminuted ores where the product of a roasting furnace is to be transferred to a smelter, a system of portable closed containers, and transfer means for said containers whereby the full containers from a roasting furnace are replaced by empty containers from a smelter, and empty containers from a smelter are replaced by full containers from a roasting furnace, said means consisting of a transfer car having suitable means for lifting said containers and moving them onto and off from said car, said car having also means for steadying said containers laterally to hold them upright when lifted, and a platform upon which to rest said containers while they are being transferred from a roasting furnace to a smelting furnace.

25. The combination with a reverberatory furnace for smelting dusty materials, said furnace having charging holes in its roof, of an extensible tube fitting said holes and adapted to be projected down below said holes into the furnace chamber so that its lower end may be brought near or contiguous to the pile of material in said chamber, and means for gradually raising said tube allowing the charge to be progressively built up and sloped somewhat conically from the lower end of said tube without spreading over the molten bath and without raising a cloud of dust inside the furnace; whereby slag losses will be lessened and free dust from dusty materials will be prevented from escaping into the furnace chamber.

In testimony whereof I affix my signature.

ALEXANDER GRANT McGREGOR.